United States Patent
Baba (10) Patent No.: US 9,551,870 B2
(45) Date of Patent: Jan. 24, 2017

(54) TRANSMISSIVE DISPLAY DEVICE AND METHOD OF CONTROLLING TRANSMISSIVE DISPLAY DEVICE

(71) Applicant: Seiko Epson Corporation, Tokyo (JP)

(72) Inventor: Hiroyuki Baba, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 18 days.

(21) Appl. No.: 14/334,002

(22) Filed: Jul. 17, 2014

(65) Prior Publication Data

US 2015/0022542 A1  Jan. 22, 2015

(30) Foreign Application Priority Data

Jul. 18, 2013  (JP) ................................ 2013-149355

(51) Int. Cl.
G02B 27/01 (2006.01)

(52) U.S. Cl.
CPC ..... *G02B 27/017* (2013.01); *G02B 2027/0118* (2013.01); *G02B 2027/0178* (2013.01); *G09G 2360/144* (2013.01)

(58) Field of Classification Search
CPC .............. G09G 5/02; G09G 2320/0626; G09G 2320/0646; H04N 1/60; G02B 27/01; G02B 2027/0118; G02B 2027/014; G02B 2027/0141; G02B 2027/0178
See application file for complete search history.

(56) References Cited

U.S. PATENT DOCUMENTS

| | | | | |
|---|---|---|---|---|
| 8,928,556 B2* | 1/2015 | Yasue | .................. | G02B 27/017 345/8 |
| 8,963,805 B2* | 2/2015 | Sugden | ................ | G02B 27/017 345/8 |
| 2009/0298547 A1* | 12/2009 | Kim | ........................ | G06F 1/162 455/566 |
| 2012/0038663 A1* | 2/2012 | Gustafsson | .......... | G02B 27/017 345/629 |
| 2013/0147859 A1* | 6/2013 | Kobayashi | ............... | G09G 5/10 345/690 |
| 2013/0314453 A1* | 11/2013 | Ko | .......................... | G09G 5/10 345/690 |
| 2014/0132484 A1* | 5/2014 | Pandey | ................. | G06T 19/006 345/8 |
| 2014/0204023 A1* | 7/2014 | Kumar | ............... | G06K 9/00671 345/156 |

FOREIGN PATENT DOCUMENTS

| | | |
|---|---|---|
| JP | 2007-101618 A | 4/2007 |
| JP | 2009-265352 A | 11/2009 |
| JP | 2010-85786 A | 4/2010 |

OTHER PUBLICATIONS

Epson, See-through Mobile Viewer MOVERIO BT-100 User's Guide, Epson Sales Japan Corporation, Seiko Epson Corporation, p. 12, Nov. 2011.

* cited by examiner

*Primary Examiner* — Antonio A Caschera
(74) *Attorney, Agent, or Firm* — ALG Intellectual Property, LLC (57) ABSTRACT

A head mounted display device that allows a user to visually recognize a content as a virtual image, includes a display part that displays the content in a predetermined display area, and a control part that determines a background color of the content and use environment brightness and adjusts brightness of the display area in response to the determination results thereof.

16 Claims, 7 Drawing Sheets

TRANSMISSIVE DISPLAY DEVICE AND METHOD OF CONTROLLING TRANSMISSIVE DISPLAY DEVICE

BACKGROUND

1. Technical Field

The present invention relates to a transmissive display device that allows a user to visually recognize contents as virtual images and a method of controlling the transmissive display device.

2. Related Art

In related art, as a kind of transmissive display device, a head mounted display device (head mounted display: HMD) using a transmissive display having a spectacle shape worn on a head has been known. For example, in a head mounted display of Non-Patent Document 1 (See-Through Mobile Viewer MOVERIO BT-100 User's Guide, Epson Sales Japan Corporation, Seiko Epson Corporation, page 12 (http://dl.epson.jp/support/manual/data/moverio/bt100/U_GUIDE_BT100.PDF)), screen brightness is manually adjustable according to contents to be viewed and use environment brightness. When reading an electronic book with a darker background color, a user is harder to see character information because the user can see an external world well through a virtual display area in which a virtual image is displayed, and adjusts the screen brightness to be higher. To the contrary, when reading an electronic book with a lighter background color, the user can clearly see character information because the user cannot see the external world well through the virtual display area, and adjusts the screen brightness to be lower.

However, in the head mounted display of related art, manual adjustment of the screen brightness is required for the user and the operation is troublesome. Further, recently, industrial application of display of manuals, operating instruction information, etc. on the head mounted display device has attracted attention. The brightness adjustment during operation is not only troublesome but also causes operation errors, and improvements are desired.

SUMMARY

An advantage of some aspects of the invention is to provide a transmissive display device that may display contents with appropriate screen brightness without the need for troublesome operation by a user and a method of controlling the transmissive display device.

A transmissive display device according to an aspect of the invention is a transmissive display device that allows a user to visually recognize a content as a virtual image, including a display part that displays the content in a predetermined display area, a background color determination part that determines a background color of the content, and a brightness adjustment part that adjusts brightness of the display area in response to the background color of the content.

A method of controlling a transmissive display device according to an aspect of the invention is a method of controlling a transmissive display device that allows a user to visually recognize a content as a virtual image, including determining a background color of the content, and adjusting brightness of a display area for displaying the content in response to the background color of the content.

According to the configuration of the aspect of the invention, the brightness of the display area (screen) for displaying the content is adjusted in response to the background color of the content, and thus, even when the background color of the content is darker, characters and images are not harder to be seen. Further, the content may be displayed constantly with appropriate screen brightness without the need for troublesome operation by the user, and, when the transmissive display device is used for industrial application, work load and work errors of the user may be reduced.

Note that "background color of content" is a concept including hue, brightness, luminosity, saturation, etc. due to the background color of the content.

Further, the brightness adjustment of the display area may be performed by varying the brightness of a light source (backlight) that irradiates the display part or processing of shuttering a light modulator.

Furthermore, "content" refers to single image data in the case of a still image content, single frame data or an aggregate of frame data in the case of a moving image content, single page data or an aggregate of page data in the case of a book content, or the like. Therefore, in the case of the book content, for example, brightness adjustment may be performed while the background color is determined with respect to each page data, or brightness adjustment may be performed with respect to all page data within the content in response to the determination result of the background color in an arbitrary one page.

The transmissive display device described above may be configured to further include a use environment brightness determination part that determines use environment brightness, and the brightness adjustment part adjusts the brightness of the display area in response to the use environment brightness.

According to this configuration, the content may be displayed constantly with appropriate screen brightness regardless of the use environment brightness. For example, it is considered that adjustment of raising the screen brightness is performed in the lighter use environment, and adjustment of reducing the screen brightness is performed (or the screen brightness is not changed) in the darker use environment.

Note that the detection part may detect the use environment brightness around (ahead of) the user using an imaging sensor (camera) or a brightness sensor. Further, the current position or the working room of the user may be specified using a GPS (Global Positioning System) technology, an RFID (radio frequency identification) technology, or the like, and the use environment brightness may be determined from the specified result.

Further, as the use environment brightness, environment illuminance around the transmissive display device (amount of light applied to the display surface of the transmissive display device) may be determined.

Furthermore, as the use environment brightness, not only the illuminance in the location where the user is present but also the illuminance of the point of view (the illuminance ahead of the point of view of the user) may be determined and the brightness of the display area may be adjusted in response to both of the determination results. According to the configuration, adjustment to more optimal screen brightness may be performed in response to usage conditions such that the user sees the lighter outside from inside of the room and the user uses the device only inside of the room.

The transmissive display device described above may be configured such that the content is a book content, and the background color determination part determines the background color in a text area of the book content.

According to this configuration, a problem that characters are harder to be seen due to the background color of the electronic book may be solved.

Note that, in the case where the electronic book is a book mainly containing texts such as a paperback book, the background color of the book (ground color of paper) may be determined with the text area as a page area. Further, as a determination method, when the format of the electronic book is a format of designating the background color as information (HTML or the like), for example, the background color may be determined based on the information. Furthermore, in the case of an image format including PDF, the text area may be extracted by an image analysis and the background color may be determined based on pixel information of the text area.

Also, note that, in the case where a plurality of frames exist in a frame memory that stores the content (in the case of a 3D content, a moving image content, or the like), the background color may be determined with respect to one frame of them. Further, the background color may be determined by reading image light displayed on the transmissive display device using a CCD sensor or the like.

The transmissive display device described above may be configured to further include a character color determination part that determines a character color in the text area, and the brightness adjustment part adjusts the brightness of the display area in response to the character color.

According to this configuration, the content may be displayed with more appropriate screen brightness in response not only to the background color but also the character color of the text area. For example, a method of not raising the screen brightness depending on the character color even when the background color is darker or the like may be considered.

The transmissive display device described above may be configured such that the background color determination part determines a color most frequently appearing in the content as the background color of the content.

According to this configuration, even when the format of the electronic book is not the format of designating the background color as information, the background color of the content may be determined by a simple image analysis.

The transmissive display device described above may be configured such that the background color determination part detects areas in the same color in a predetermined or wider range from the content and determines the color of the areas in the same color as the background color of the content.

According to this configuration, even when the format of the electronic book is not the format of designating the background color as information, the background color of the content may be determined by a simple image analysis.

Note that "detecting areas in the same color in a predetermined or wider range" refers to detecting a predetermined number of continuous pixels in the same color in the case of a liquid crystal display device, for example.

The transmissive display device described above may be configured such that the content is a book content, and the background color determination part detects data in a predetermined position in a predetermined page of the book content and determines a color of the data as the background color of the content.

According to this configuration, in the case of the book content mainly containing texts such as a paperback book, the same paper color is often used except for the front cover of the book, and the background color may be correctly determined by detection of data (a pixel in the case of a liquid crystal display device) in a predetermined position in a predetermined page.

The transmissive display device described above may be configured to further include a transmittance adjustment part that adjusts transmittance of outside light entering the display part, and the transmittance adjustment part adjusts the transmittance of the outside light in response to the background color of the content.

According to this configuration, the transmittance of the outside light is adjusted in response to the background color of the content, and thus, even when the background color of the content is darker, characters and images may be better to be seen. For example, it may be considered that, when the background color of the content is darker, the adjustment of reducing the transmittance is performed so that the characters and the images may be better to be seen.

Note that the transmittance of the outside light may be adjusted in response not only to the background color of the content but also to the use environment brightness and the character color. Further, as means for varying the transmittance, for example, attachment of an electronic shade to the front surface of the display part (at the opposite side to the user side) may be considered.

The transmissive display device described above may be configured such that the display part includes a transmissive display part for right eye and a transmissive display part for left eye, and the brightness adjustment part independently adjusts brightness of a display area for right eye that can be displayed by the transmissive display part for right eye and a display area for left eye that can be displayed by the transmissive display part for left eye.

According to this configuration, in the case where the aspect of the invention is applied to a transmissive display device having a transmissive display part for right eye and a transmissive display part for left eye such as a head mounted display, the brightness of the display area for right eye and the display area for left eye may be independently adjusted, and thus, appropriate adjustment may be performed in response to eye properties of users (individuals) (individual differences of right and left eyes, eye sight differences between right and left, etc.)

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
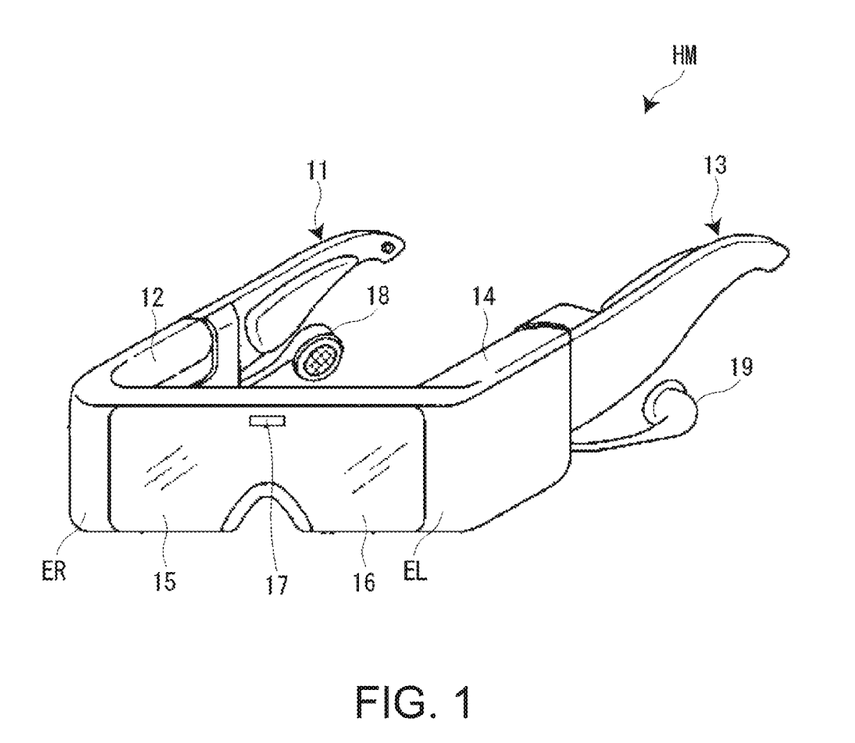
FIG. 1 is an appearance perspective view of a head mounted display device according to one embodiment of the invention.

Hereinafter, a transmissive display device and a method of controlling the transmissive display device according to one embodiment of the invention will be explained with reference to the accompanying drawings. FIG. 1 is an appearance perspective view of a head mounted display device HM to which the transmissive display device according to the invention is applied. The head mounted display device HM is worn on a head by a user and also called a head mounted display (HMD). The head mounted display device HM of the embodiment is an optically transmissive head mounted display device HM (transmissive head mounted display device, see-through type head mounted display) with which a user can visually recognize a virtual image and directly and visually recognize an outside scenery, and has a spectacle shape.

The head mounted display device HM has a right holding part 11, a right display driving part 12, a left holding part 13, a left display driving part 14, a right optical image display part 15, a left optical image display part 16, an imaging sensor 17 (detection part).

The right optical image display part 15 and the left optical image display part 16 are provided in positions corresponding to the fronts of the right and left eyes of the user when the head mounted display device HM is worn. One end of the right optical image display part 15 and one end of the left optical image display part 16 are connected in a position corresponding to the glabella of the user when the head mounted display device HM is worn. The right holding part 11 extends from an end ER as the other end of the right optical image display part 15. Similarly, the left holding part 13 extends from an end EL as the other end of the left optical image display part 16.

The right holding part 11 is a member provided to extend to form a nearly right angle with the right optical image display part 15 from the end ER of the right optical image display part 15 to the position corresponding to the temporal part of the user when the head mounted display device HM is worn. Similarly, the left holding part 13 is a member provided to extend to form a nearly right angle with the left optical image display part 16 from the end EL of the left optical image display part 16 to the position corresponding to the temporal part of the user when the head mounted display device HM is worn. The right holding part 11 and the left holding part 13 hold the head mounted display device HM on the head of the user like temples of spectacles.

The right display driving part 12 is provided inside of the right holding part 11, in other words, on the side facing the head of the user when the head mounted display device HM is worn at the end ER side of the right optical image display part 15. Further, the left display driving part 14 is provided inside of the left holding part 13 at the end EL side of the left optical image display part 16.

The imaging sensor 17 is provided in a position corresponding to the glabella of the user when the head mounted display device HM is worn. The imaging sensor 17 images the outside scenery in a direction of a range of view of the user (ahead of the user) when the head mounted display device HM is worn. In the embodiment, the user environment brightness is detected from a taken image imaged by the imaging sensor 17. The imaging sensor 17 is also used for determination of the operation of the user. The head mounted display device HM recognizes a pointer operated by the user from the taken image and generates an operation signal. As the pointer, for example, a fingertip of the user, a ring-shaped input device worn by the user, a pen tip of a pen held by the user, a light emitter of a remote controller, or the like is used. Note that it is preferable that the imaging range by the imaging sensor 17 is a wider range than a range of view 21 of the user when the head mounted display device HM is worn. (see FIGS. 2A to 3B).

Note that, in the embodiment, the configuration with one imaging sensor 17 is exemplified, however, a configuration with a plurality of the imaging sensors 17 may be employed. Further, detecting means is not limited to the imaging sensor 17, but any kinds of detecting means that can detect the use environment brightness and detect the pointer may be employed. For example, a brightness sensor or an illuminance sensor may be used for detection of the use environment brightness, and a laser sensor or an ultrasonic sensor may be used for detection of the pointer.

The head mounted display device HM further has a right earphone 18 for right ear and a left earphone 19 for left ear. The right earphone 18 and the left earphone 19 are worn on the right and left ears, respectively, when the head mounted display device HM is worn by the user. Further, though not particularly illustrated, a control mechanism for realization of a control unit 30, which will be described later, is built in the right display driving part 12 or the left display driving part 14.

Figure 2A:
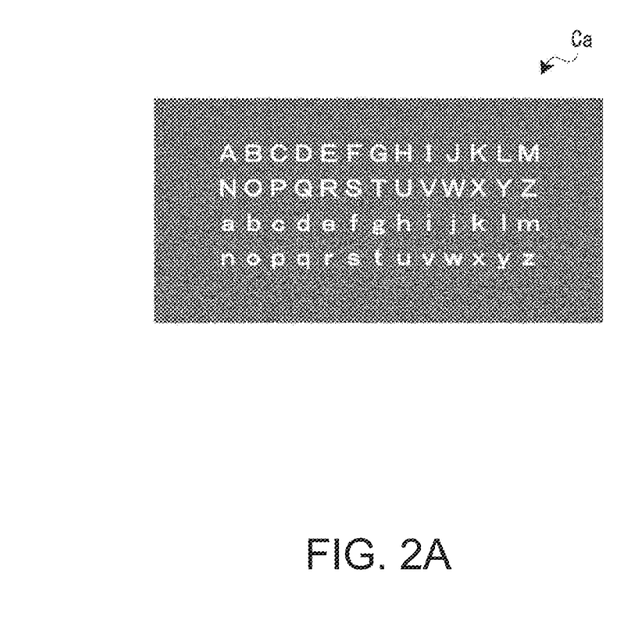
FIG. 2A shows an example of a content having a darker background.
Figure 2B:
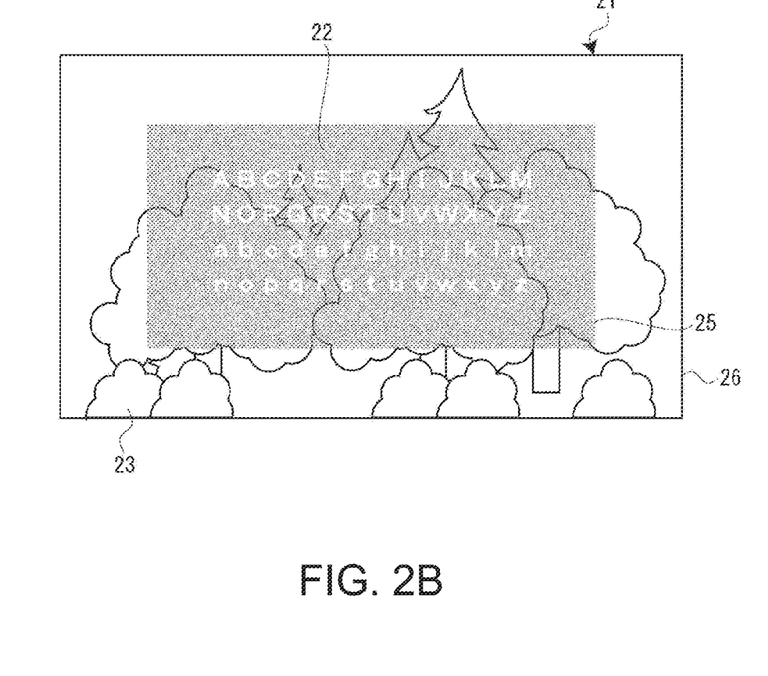
FIG. 2B shows a display example of the content by the head mounted display device.

Next, with reference to FIGS. 2A to 3B, information that can be visually recognized by the user wearing the head mounted display device HM and a visual recognition state that changes in response to a background color of a content will be explained. FIG. 2A shows an example of a book content Ca with the darker background. Further, FIG. 2B shows information that can be visually recognized by the user when the book content Ca is displayed by the head mounted display device HM. As shown in FIG. 2B, in the range of view 21 of the user wearing the head mounted display device HM, a virtual image 22 generated by the head mounted display device HM, i.e., the book content Ca in FIG. 2A is displayed. Furthermore, the user can see an outside scenery 23 in an area except for the area in which the virtual image 22 is displayed of the range of view 21. The outside scenery 23 is information that can be seen because the right optical image display part 15 and the left optical image display part 16 have light transmissivity. Hereinafter, the area in which the virtual image 22 is displayed is referred to as "virtual image display area 25" and the other area is referred to as "outside scenery visual recognition area 26". Note that "display area" in the appended claims refers to "virtual image display area 25".

Figure 3A:
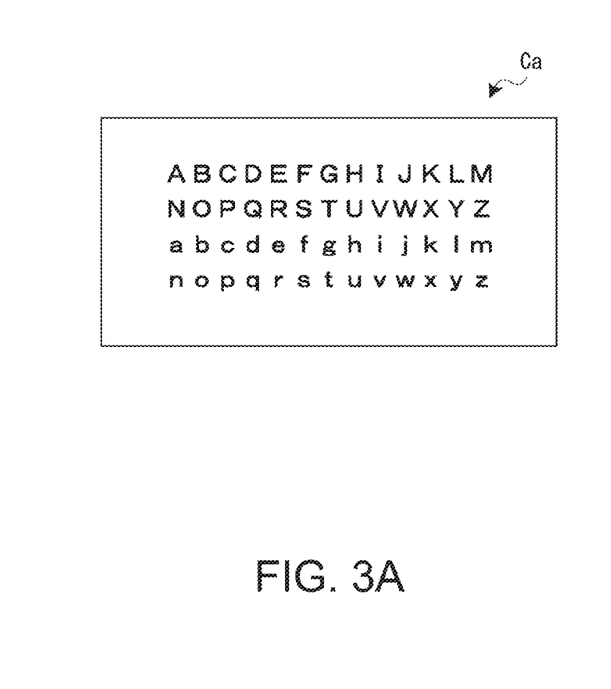
FIG. 3A shows an example of a content having a lighter background.
Figure 3B:
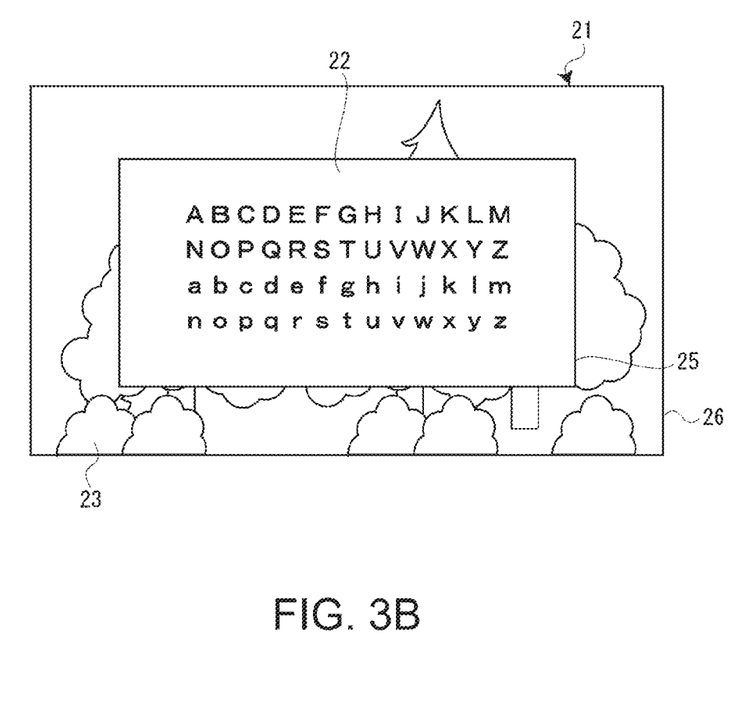
FIG. 3B shows a display example of the content by the head mounted display device.

Using the head mounted display device HM of the embodiment, the outside scenery 23 is seen through on the back of the virtual image 22 with respect to the virtual image display area 25. Accordingly, character information or the like may be harder to be seen due to the background color (brightness) of the content displayed as the virtual image 22. For example, in the case of the book content Ca with the darker background color as shown in FIG. 2A, the outside scenery 23 displayed on the back of the virtual image 22 is seen well, and thereby, the character information is harder to be seen as shown in FIG. 2B. To the contrary, in the case of a book content Cb with the lighter background color as shown in FIG. 3A, the outside scenery 23 is not seen very well, and thereby, the character information is clearly seen as shown in FIG. 3B. On the other hand, the visual recognition of the character information also changes depending on the use environment brightness. For example, the character information is harder to be seen in the lighter use environment. To the contrary, in the darker use environment, the character information is clearly seen. Accordingly, in the embodiment, in order to keep good visual recognition of contents (particularly, the character information), the screen brightness is automatically adjusted in response to the background color of the contents and the use environment brightness. The details will be described later.

Figure 4:
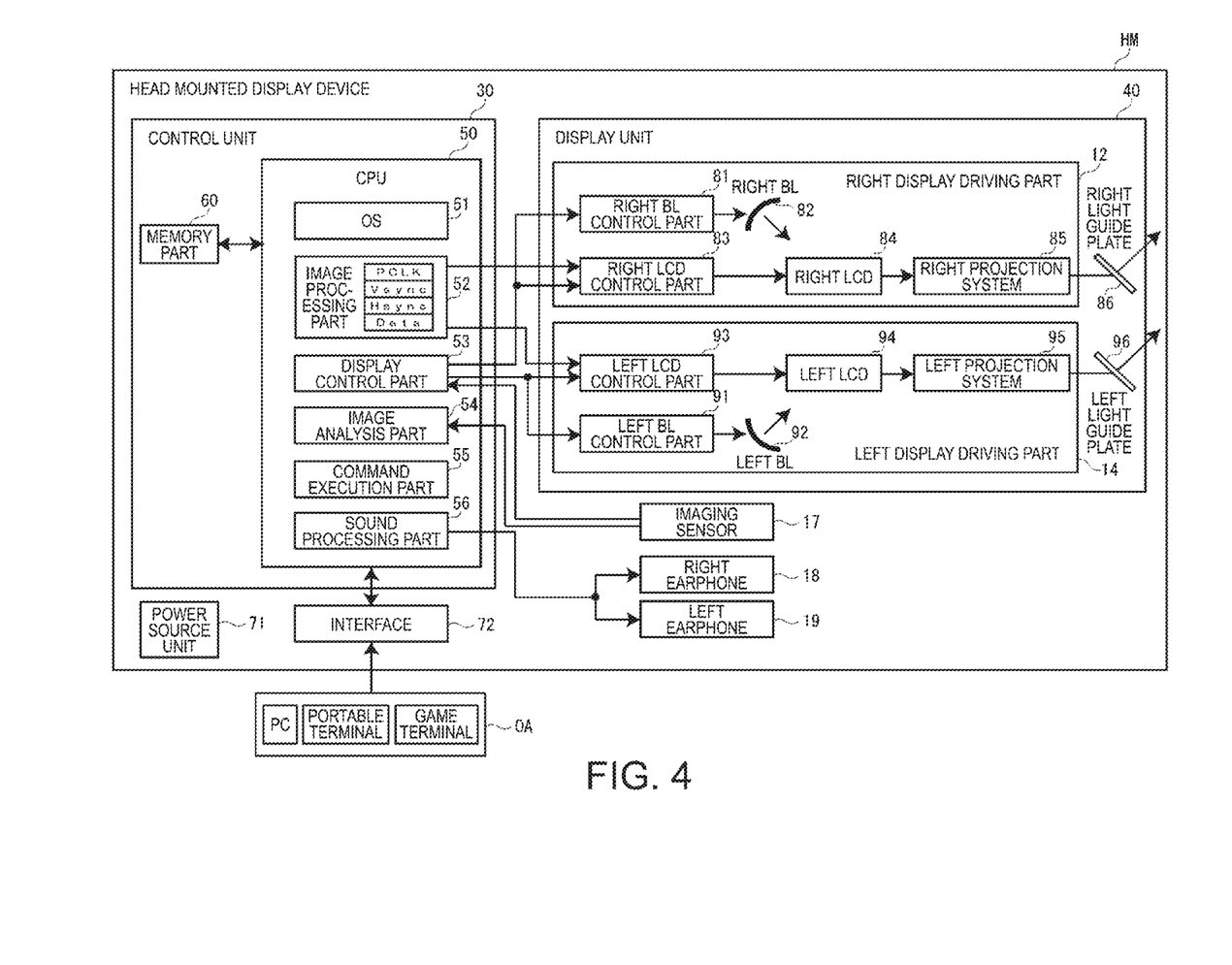
FIG. 4 is a block diagram showing a functional configuration of the head mounted display device.

Next, the functional configuration of the head mounted display device HM will be explained with reference to FIG. 4. The head mounted display device HM has a display unit 40 for the user to visually recognize the virtual image 22, the imaging sensor 17, the right earphone 18, the left earphone 19, a power source unit 71, an interface 72, and the control unit 30 that controls the respective parts.

The power source unit 71 supplies electric power to the respective parts of the head mounted display device HM. The interface 72 is for connection to various external devices OA as supply sources of contents including images (still images, moving images) and sound. As the external devices OA, for example, there are personal computers, portable terminals (cell phones, smartphones, or the like), game terminals, etc. As the interface 72, for example, a USB interface, a micro USB interface, an interface for memory card, a wireless LAN interface, or the like may be employed.

The control unit 30 has a CPU (Central Processing Unit) 50 and a memory part 60. The memory part 60 includes a ROM (Read Only Memory) and a RAM (Random Access Memory), and stores various computer programs such as applications (viewers) supporting formats of contents. The CPU 50 reads out and executes the computer programs from the memory part 60, and thereby, functions as an operating system (OS) 51, an image processing part 52, a display control part 53, an image analysis part 54, a command execution part 55, and a sound processing part 56.

The image processing part 52 generates signals for supply to the display unit 40 based on the contents input via the interface 72, and transmits the signals to the display unit 40. The signals for supply to the display unit 40 are different between the cases of the analog format and the digital format.

For example, in the case of the analog format, the image processing part 52 generates a clock signal PCLK, a vertical synchronizing signal VSync, a horizontal synchronizing signal HSync, and image data Data, and transmits them. Specifically, the image processing part 52 acquires an image signal contained in the content (e.g., an analog signal including thirty frame images per second), and separates the synchronizing signals including the vertical synchronizing signal VSync and the horizontal synchronizing signal HSync from the acquired image signal. Then, the image processing part 52 generates a clock signal PCLK using a PLL circuit or the like (not shown) in response to the separated vertical synchronizing signal VSync, horizontal synchronizing signal HSync, or the like. Further, the image processing part 52 converts the analog image signal from which the synchronizing signals have been separated into a digital image signal using an A/D converter circuit or the like (not shown) and generates the image data Data.

On the other hand, in the case of the digital format, the image processing part 52 generates the clock signal PCLK and the image data Data and outputs them to the display unit 40. Specifically, in the case where the content is in the digital format, the clock signal PCLK is output in synchronization with the image signal. Accordingly, the vertical synchronizing signal VSync, the horizontal synchronizing signal HSync, and the A/D conversion of the analog image signal are unnecessary.

Note that the image processing part 52 executes image processing such as resolution conversion processing, color tone correction processing including adjustment of brightness and saturation, and keystone correction processing with respect to the image data Data according to necessity.

The display control part 53 generates control signals for controlling the right display driving part 12 and the left display driving part 14 and outputs the signals to the display unit 40, and thereby, controls an image display condition in the display unit 40. Specifically, the display control part 53 individually controls ON/OFF of driving of a right LCD 84 by a right LCD control part 83, ON/OFF of driving of a right backlight 82 by a right backlight control part 81, ON/OFF of driving of a left LCD 94 by a left LCD control part 93, ON/OFF of driving of a left backlight 92 by a left backlight control part 91, etc. using the control signals, and thereby, controls generation and output of image lights by the respective right display driving part 12 and left display driving part 14. For example, when side-by-side 3D video data is displayed, with respect to display data for one screen of the side-by-side format, with display data for the left half as display data for left eye, the data is processed by the display control part 53 to be in full-screen display, i.e., to be doubled in the horizontal display size and the data is output to the left display driving part as display data. Also, with respect to display data for the right half, the same processing is performed as display data for right eye. Further, the display control part 53 adjusts the intensity of the right backlight 82 and the left backlight 92 in response to the background color of the image data Data and the use environment brightness, and thereby, adjusts screen brightness. Here, "screen" to be brightness-adjusted directly refers to "virtual image display area 25", however, in the embodiment, refers to both "virtual image display area 25" and "outside scenery visual recognition area 26" because "outside scenery visual recognition area 26" is also affected (see FIGS. 2A to 3B).

The image analysis part 54 analyzes the taken image by the imaging sensor 17. For example, the use environment brightness may be obtained from the respective pixel information of the taken image. Further, a pointer is detected from the taken image and the information thereof (the detection timing, the detection position, or the like) is output to the image processing part 52 and the display control part 53. The image processing part 52 and the display control part 53 perform image processing and display control based on the output pointer information. Furthermore, the command execution part 55 executes preset various kinds of commands according to the operation of the pointer. The sound processing part 56 acquires a sound signal contained in the content and amplifies the acquired sound signal, and outputs the signal to the right earphone 18 and the left earphone 19.

The display unit 40 has the right display driving part 12 (transmissive display part for right eye), the left display driving part 14 (transmissive display part for left eye), a right light guide plate 86 as the right optical image display part 15, and a left light guide plate 96 as the left optical image display part 16. Note that, in the following explanation, the right optical image display part 15 (right light guide plate 86) and the left optical image display part 16 (left light guide plate 96) may be collectively referred to as "optical member".

The right display driving part 12 includes the right backlight (BL) 82 that functions as a light source, the right backlight (BL) control part 81 that performs drive control of the right backlight (BL) 82, the right LCD 84 that functions as the display device, the right LCD control part 83 that performs drive control of the right LCD 84, and a right projection system 85. The right backlight control part 81 drive-controls the right backlight 82 based on the input control signal. The right backlight 82 is a light emitter such as an LED or electroluminescence (EL), for example. The right LCD control part 83 drive-controls the right LCD 84 based on the input clock signal PCLK, vertical synchronizing signal VSync, horizontal synchronizing signal HSync, and image data Data for right eye. The right LCD 84 is a transmissive liquid crystal panel in which a plurality of pixels are arranged in a matrix form.

The right projection system 85 projects the image light output from the right LCD 84, and includes a collimator lens, for example. The right light guide plate 86 as the right optical image display part 15 is formed using a light-transmissive resin material or the like, and reflects the image light output from the right projection system 85 along a predetermined optical path and guides the light to the right eye of the user. Note that the right projection system 85 and the right light guide plate 86 are also collectively referred to as "light guide part". The light guide part may use any method as long as the part forms a virtual image in front of the eye using the image light. For example, a diffraction grating (a hologram element as an example) may be used or a semi-transmissive reflection film may be used.

The left display driving part 14 includes the left backlight (BL) control part 91, the left backlight (BL) 92, the left LCD control part 93, the left LCD 94, and a left projection system 95 like the right display driving part 12. Further, the left light guide plate 96 as the left optical image display part 16 is formed using a light-transmissive resin material or the like, and reflects the image light output from the left projection system 95 along a predetermined optical path and guides the light to the left eye of the user.

As described above, the image lights guided to both eyes of the user of the head mounted display device HM are focused on retinas, and thereby, the user visually recognizes the virtual image 22 within the virtual image display area 25 as shown in FIG. 2B, for example. Note that, in the embodiment, the visual recognition of the virtual image 22 by the user is also represented by "display".

Figure 5:
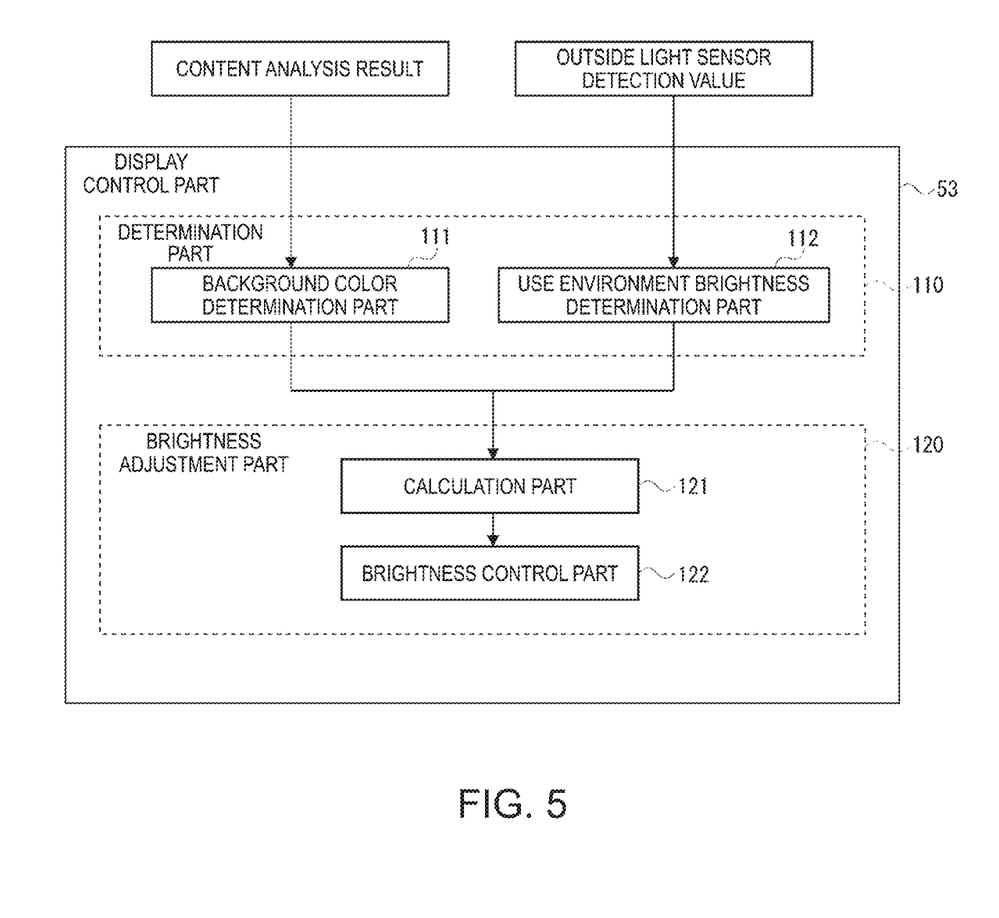
FIG. 5 is a detailed block diagram of a display control part.

Next, with reference to FIG. 5, the brightness adjustment by the display control part 53 will be described in detail. The display control part 53 mainly functions as a determination part 110 and a brightness adjustment part 120 with respect to the brightness adjustment. The determination part 110 includes a background color determination part 111 and a use environment brightness determination part 112. Further, the brightness adjustment part 120 includes a calculation part 121 and a brightness control part 122.

The background color determination part 111 determines the background color of the input content (image data Data). For example, when the content is a book content (electronic book), the background color in its text area is determined. As the determination method, for example, if the format of the electronic book is a format of designating the background color as information (for example, using a markup language including XML and HTML), the background color is determined based on the information. Further, if the information of the background color is incorporated in each page, the background color determination part 111 performs a determination with respect to each page. Note that a determination of only a predetermined page may be made and the other pages may be considered to have the same color within the same content.

Further, if the format of the electronic book is a format containing an image file and a text file, the background color determination part 111 determines the background color of the text file. Furthermore, if the format of the input content is an image format including PDF (Portable Document Format) and JPEG (Joint Photographic Experts Group), the background color determination part 111 extracts a text area by an image analysis and determines the background color based on the pixel information of the text area.

Note that, whether or not a book content is determined based on additional information (meta data) added to the content and if the book content is determined, the background color of the book (ground color of paper) may be determined with the text area as a page area. Further, if a book genre and a book name can be determined, using the determined book genre and book name as search keys, the corresponding back ground color may be searched for within a predetermined database. In this case, the predetermined database may be provided within the head mounted display device HM or within a predetermined server that can be accessed by the head mounted display device HM.

The use environment brightness determination part 112 determines the brightness ahead of the user, i.e., the brightness of the outside scenery that can be transmissively and visually recognized using the head mounted display device HM as the use environment brightness. Note that, in the embodiment, the use environment brightness is detected by the imaging sensor 17, however, not limited to that. The current position and the working room of the user are specified using a GPS (Global Positioning System) technology, an RFID (radio frequency identification) technology, or the like, and the use environment brightness may be determined from the specified result. In this case, a condition that information associating the current position or the working room with the brightness in the location exists within the head mounted display device HM or a predetermined server that can be accessed by the head mounted display device HM is assumed. Further, in the case of using the GPS technology, a condition that a GPS receiver is mounted on the head mounted display device HM is assumed. Furthermore, in the case of the RFID technology, a condition that a wireless IC tag is provided in the working room and a wireless IC reader is mounted on the head mounted display device HM is assumed.

The calculation part 121 calculates appropriate brightness (or intensity of light, illuminance) of the right backlight (BL) 82 and the left backlight (BL) 92 in response to the background color determined by the background color determination part 111 and the use environment brightness determined by the use environment brightness determination part 112. As a calculation method, it is considered that, for example, if the brightness of the background color is equal to or more than a threshold value La1 and the use environment brightness is less than a threshold value Lb1, the appropriate brightness is set to first brightness or the brightness adjustment is not performed, and, if the brightness of the background color is less than the threshold value La1 and the use environment brightness is equal to or more than the threshold value Lb1, the appropriate brightness is set to second brightness (first brightness<second brightness). That is, if the brightness of the background color is lower, it is preferable to raise the brightness of the backlights 82, 92 compared to the case where the brightness is higher, and, if the use environment brightness is higher, it is preferable to raise the brightness of the backlights 82, 92 compared to the case where the brightness is lower.

The brightness control part 122 outputs command signals to the right backlight (BL) control part 81 and the left backlight (BL) control part 91 so that the backlights 82, 92 may have the brightness calculated by the calculation part 121. Thereby, the brightness of the screen containing "virtual image display area 25" and "outside scenery visual recognition area 26" changes, and thus, the visual recognition of the content (particularly, character information) is secured. Note that the backlights 82, 92 are not necessarily controlled to have the same brightness, but may be controlled to have different brightness.

As explained above, according to the embodiment, the brightness of the screen for display of the content is adjusted in response to the background color of the content and the use environment brightness, and thereby, even when the background color of the content is darker and the use environment brightness is lighter, visual recognition of the content is not hindered. Further, even when the content is an electronic book such as a magazine, the text area is extracted and the background color is determined, and thereby, visual recognition of characters may be reliably secured. Furthermore, any operation by the user is not necessary for adjustment of the screen brightness, and thereby, even when the head mounted display device HM of the embodiment is used for industrial application, work load and work errors of the user may be reduced.

Note that, not limited to the above described embodiment, but the following modified examples may be employed.

Modified Example 1

In the above described embodiment, the screen brightness is adjusted in response to the background color of the text area and the use environment brightness, however, the character color in the text area may be further determined (character color determination part) and the screen brightness may be adjusted in response to the character color. According to the configuration, the content may be displayed with the more appropriate screen brightness in consideration not only of the background color in the text area but also of the character color. For example, adjustment of not raising the screen brightness depending on the character color even when the background color is darker and adjustment of raising the screen brightness depending on the character color even when the background color is lighter are considered. Note that, regarding the character color, the pixels forming the characters are specified by an image analysis and the color of the pixels may be determined as the character color. Further, in the case of the format of the content is a format of designating the character color as information, the character color may be determined based on the information.

Modified Example 2

Furthermore, in the above described embodiment, the text area is extracted from the content and the background color is determined, however, the extraction of the text area may be omitted. For example, a color most frequently appearing in the content (e.g., page data or an aggregate of page data in the case of a book content) may be determined as the background color of the content. According to the configuration, even in the case where the format of the electronic book is an image format in which one page is handled as one image, the background color of the content may be determined by a simple image analysis.

Modified Example 3

Furthermore, in place of modified example 2, areas in the same color in a predetermined or wider range may be detected from the content (e.g., page data in the case of a book content) and the color of the areas in the same color may be determined as the background color of the content. For example, in the case of a liquid crystal display format, a predetermined number of continuous pixels in the same color may be detected and the color of the pixels may be determined as the background color of the content. In this case, the direction in which the pixels are continuous may be arbitrary or detection may be performed only in a specific direction of the longitudinal direction/lateral direction. According to the configuration, the same advantage as that of modified example 2 may be obtained. Note that this modified example and the above described modified example 2 may be combined, and thereby, the background color of the content may be determined more accurately.

Modified Example 4

Figure 6:
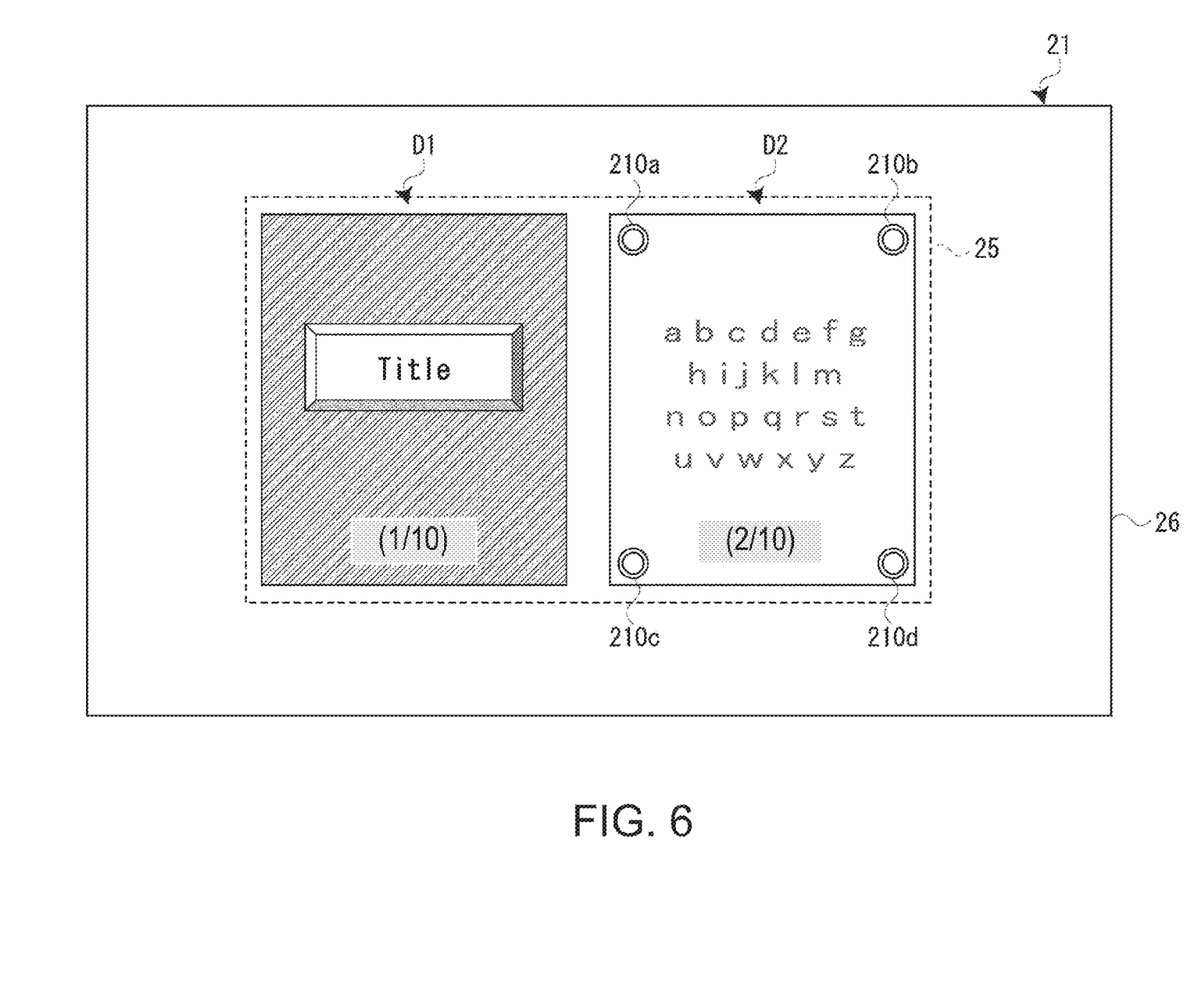
FIG. 6 is an explanatory diagram of a method of determining a background color according to modified example 4.

Further, in the case where whether or not a book content is determined based on the additional information added to the content and if the book content is determined, data (pixel) in a predetermined position in a predetermined page may be detected and the color of the data may be determined as the background color of the content. FIG. 6 is an explanatory diagram of this modified example. In the drawing, a book content in which first page data D1 is a front cover of a book and a body of the book starts from second page data D2 is exemplified. In this case, pixels 210a to 210d in the four corners of the second page data D2 may be detected and the background color may be determined from the colors thereof. For example, it may be considered that the most common color of the four pixels is determined as the background color. According to the configuration, in the case of a book content mainly containing texts such as a paperback book, the same paper color is often used except for the front cover of the book, and the background color may be correctly determined by detection of a pixel in a predetermined position in a predetermined page. Further, color determination is performed by detection of pixels in a plurality of predetermined positions, and thereby, even when an incorrect color is detected in one pixel, an erroneous determination may be prevented.

Modified Example 5

Figure 7:
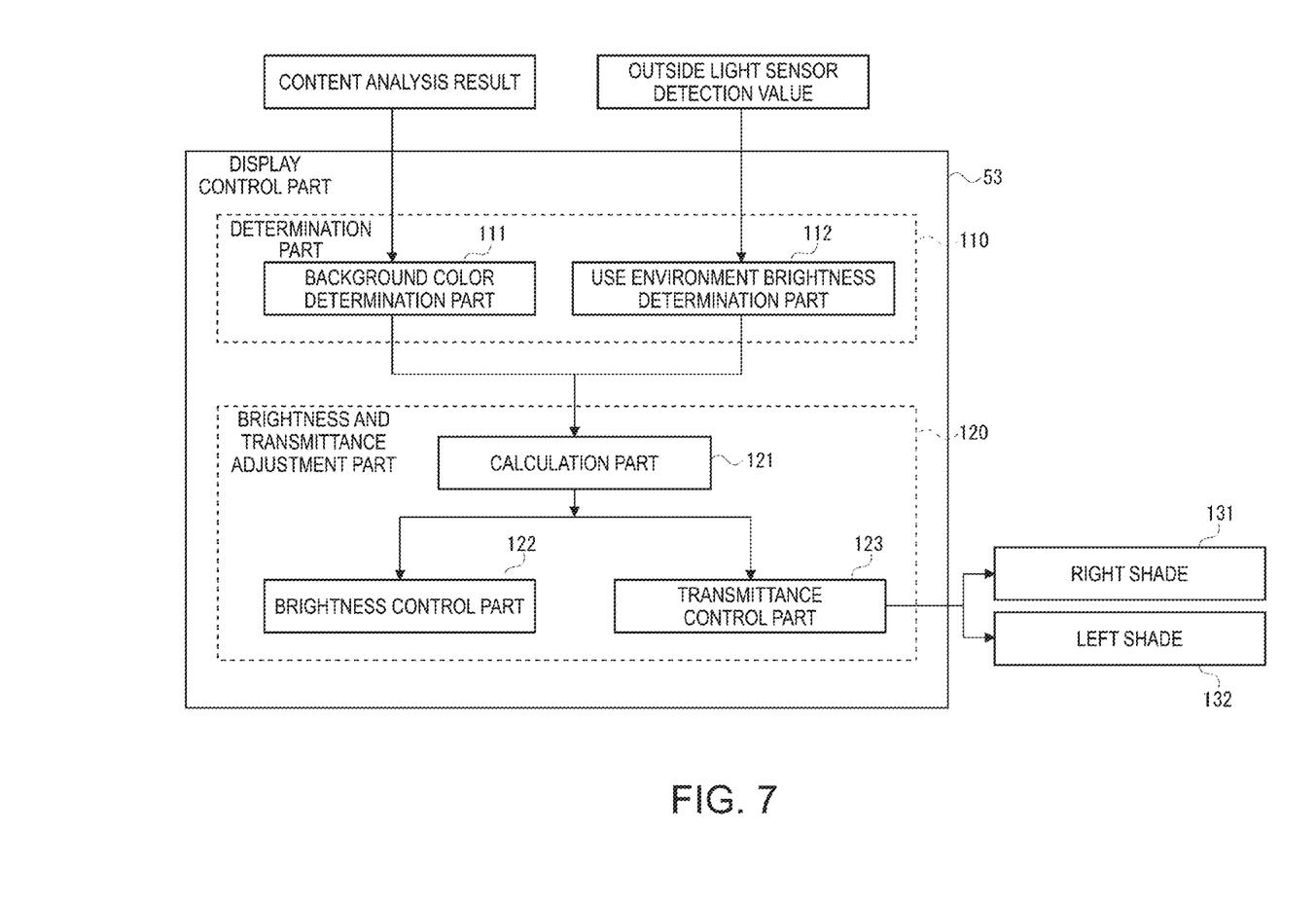
FIG. 7 is a detailed block diagram of a display control part according to modified example 5.

Furthermore, in the above described embodiment, the visual recognition of the content is secured by adjustment of the screen brightness, however, another method may be combined. FIG. 7 is a block diagram of a display control part 53 according to the modified example. The modified example is different from the example shown in FIG. 5 in that a transmittance control part 123 is added. Further, electronic shades (a right shade 131 and a left shades 132) are respectively added onto the front surfaces (at the external world side) of the right optical image display part 15 and the left optical image display part 16. Note that "transmittance adjustment part" in the appended claims corresponds to the calculation part 121 and the transmittance control part 123 in this modified example.

In this case, the calculation part 121 calculates transmittance of the right and left electronic shades 131, 132 in response to the background color of the content and the use environment brightness. Further, the transmittance control part 123 controls the transmittance of the right and left electronic shades 131, 132 to be transmittance calculated by the calculation part 121 (varies voltage values applied to the electronic shades 131, 132). Specifically, when the background color of the content is darker or the use environment brightness is lighter (there is a need to raise the screen brightness), the transmittance control part 123 makes adjustment of reducing the transmittance of the outside light entering the right optical image display part 15 and the left optical image display part 16. According to the configuration, even when the background color of the content is darker or the use environment brightness is lighter, visual recognition of the content may be secured more reliably.

Note that, not the separate type shades like the right shade 131 and the left shade 132, but an integrated shade may be used. Further, the adjustment of the screen brightness and the adjustment of the transmittance of the electronic shades 131, 132 may not be performed at the same time, but either one may be selectively performed. Furthermore, when the colors of the electronic shades 131, 132 are changeable, the colors may be changed in addition to the transmittance. Moreover, the right and left electronic shades 131, 132 may be independently controlled.

Modified Example 6

Further, in the above described embodiment, if the brightness of the background color is less than the threshold value La1 or the use environment brightness is equal to or more than the threshold value Lb1, the brightness of the backlights 82, 92 is increased, however, the brightness of the background color and the use environment brightness are determined using an AND condition, not the OR condition, and the appropriate brightness of the backlights 82, 92 may be calculated based on the determination result. Similarly, the transmittance of the electronic shades 131, 132 may be calculated based on the determination result using the AND condition.

Modified Example 7

Furthermore, in the above described embodiment, the screen brightness is adjusted in response to whether or not the brightness of the background color and the use environment brightness are respectively equal to or more than the predetermined threshold values, however, a plurality of threshold values may be provided and the screen brightness may be adjusted at a plurality of steps. Further, the screen brightness may be linearly adjusted in response to the brightness of the background color and/or the use environment brightness. Similarly, the transmittance of the electronic shades 131, 132 may be adjusted at a plurality of steps or linearly.

Modified Example 8

Further, in the above described embodiment, the screen brightness is adjusted by changing the brightness of the backlights 82, 92, however, the screen brightness (in this case, the brightness of the virtual image display area 25) may be adjusted by processing of shuttering the LCDs 84, 94 (processing of adjusting transmittance of light using a polarizer and an alignment film or the like).

Modified Example 9

Further, in the above described embodiment, the case where the size of the virtual image display area 25 is smaller than the size of the outside scenery visual recognition area 26 is exemplified, however, not limited to that. The invention may be also applied to the case where the virtual image display area 25 and the outside scenery visual recognition area 26 have the same size (in other words, the virtual image display area 25 has a size equal to that of the range of view 21) or the virtual image display area 25 is larger than the outside scenery visual recognition area 26 (in other words, the virtual image display area 25 is larger than the range of view 21).

Modified Example 10

Further, in the above described embodiment, the head mounted display device HM is realized by packaging of the display unit 40 for the user to visually recognize the virtual image, the control unit 30 that controls the display unit 40, etc. within one casing (within the device), however, they may be realized as separate devices. That is, the head mounted display device HM main body including the display unit 40, the imaging sensor 17, and the earphones 18, 19 and a controller (not shown) including the control unit 30 may be adapted to be communicate with each other. In this case, the main body and the controller may be wire-connected or connected via a wireless LAN, infrared communication, Bluetooth (registered trademark), or the like. Further, the function of the controller may be realized by a personal computer, a portable information terminal (a PAD, a cell phone, a watch-type portable terminal), or the like.

Other Modified Examples

Furthermore, in the above described embodiment, the visual recognition of the content is secured by adjustment of the screen brightness in response to the background color of the content and the use environment brightness, however, the color of the content may be varied in addition to the adjustment of the screen brightness. For example, it may be considered that the color having a relationship of complementary color with the background color of the content (the color diagonal from the background color in the color circle) is increased for improvement of the visual recognition of the text. Note that the variable control of the color of the content may be performed only in the text area or with respect to the one whole screen.

Further, in the above described embodiment, the display control part 53 adjusts the intensity of the right backlight 82 and the left backlight 92 at the same time, however, they may be independently adjusted (brightness adjustment part). According to the configuration, appropriate adjustment may be performed in response to eye properties of individuals (individual differences of right and left eyes, eye sight differences between right and left, etc.). Note that, in this case, it is preferable that the user may set or select with or without brightness adjustment of the right and left display areas, amounts of brightness adjustment of the right and left display areas, brightness adjustment methods of the right and left display areas, or the like. Further, when variable control of the color of content is performed in the above described manner, the variable control of the color may be independently performed with respect to the right and left display frames. Furthermore, when the colors of the backlights 82, 92 and the colors of the electronic shades 131, 132 are adjustable, variable control of the right and left light colors and shade colors may be independently performed. Note that, regarding color variable control of the backlights/electronic shades, it is preferable to determine the variably-controlled colors (e.g., the color having a relationship of complementary color with the background color) so that the visual recognition of the characters in the text area may be improved in response to the background color of the content.

Furthermore, various display modes including the above described brightness adjustment items and color variable control items of content/backlight/electronic shade may be selected by the user. For example, one of the first mode of screen brightness adjustment in response to only the background color of the content, the second mode of screen brightness adjustment in response to the background color of the content and the use environment brightness, and the third mode without screen brightness adjustment may be selected. Further, whether or not the content is an electronic book may be determined, and one of the first mode of screen brightness adjustment only in the case of the electronic book, the second mode of screen brightness adjustment regardless of whether or not the content is an electronic book, and the third mode without screen brightness adjustment may be selected. Furthermore, illuminance of the location where the user is present and illuminance of the point of view may be determined, and one of the first mode of screen brightness adjustment in response to both of the determination results, the second mode of screen brightness adjustment in response to only the illuminance of the location where the user is present, and the third mode without screen brightness adjustment may be selected. Moreover, one of the first mode of the screen brightness adjustment and the color variable control of content/backlight/electronic shade in response to the background color of the content and/or the use environment brightness, the second mode of only the screen brightness adjustment, and the third mode without either of the screen brightness adjustment or the color variable control of content/backlight/electronic shade may be selected.

Further, in the above described embodiment, the binocular-type head mounted display device HM (optical transmissive head mounted display device) is exemplified as the transmissive display device, however, the invention may be applied to other types of head mounted display device such as a video transmission type and a monocular type. Furthermore, in the above described embodiment, the spectacle-type head mounted display device HM that covers the fronts of the eyes is exemplified, however, not limited to that. The invention may be applied to types that do not completely cover the fronts of the eyes (types that partially cover the fronts of the eyes). In addition, the invention may be applied to other transmissive display devices including a head-up display, not limited to the head mounted display device.

Furthermore, in the above described embodiment, the display driving parts 12, 14 including the backlight control parts 81, 91, the backlights 82, 92, the LCD control parts 83, 93, and the LCDs 84, 94 are exemplified, however, the forms are just examples and configuration parts for realization of other systems together with these configuration parts or in place of these configuration parts may be provided.

For example, a configuration including an organic EL (Organic Electro-Luminescence) display and an organic EL control unit may be employed. Further, in place of the LCD, an LCOS (Liquid crystal on silicon, LCos is a registered trademark), a digital micromirror device, or the like may be used. Furthermore, the invention may be applied to a laser retina projection-type head mounted display device. In the case of the laser retina projection type, "display area" may be defined as an image area recognized by the eyes of the user. In addition, the optical system of the head mounted display device HM is for allowing outside light to be transmitted through an optical member and enter the eyes of the user with the image light. The optical member is not limited to one that guides the image light into the member, but may be one that diffracts or reflects the light toward the eyes of the user.

Further, in the embodiment, the projection systems 85, 95 are applied as the optical systems, however, the form is just an example. For example, a scanning system using an MEMS mirror as the optical system and a signal light modulation part that outputs signal light to the scanning system may be employed. In this case, the signal light formed and output by the signal light modulation part enters the scanning system (MEMS mirror) as a scanning part. The scanning system outputs the signal light as the scanning light toward a light guide member having a half-mirror layer and the surface of the half-mirror layer is scanned by the scanning light, and thereby, a virtual image by the image light may be formed and the image is recognized by the user capturing the virtual image with eyes.

Furthermore, the respective functions of the head mounted display device HM shown in the above described embodiment may be provided as programs. Further, the programs may be stored and provided in various recording media (CD-ROMs, flash memories, etc.). That is, programs for a computer to function as the respective component elements of the head mounted display device HM and recording media recording the programs fall within the scope of the invention. In addition, regardless of the above described examples, changes may be made to the device configuration, the processing steps, etc. of the head mounted display device HM accordingly without departing of the scope of the invention.

The entire disclosure of Japanese Patent Application No. 2013-149355, filed Jul. 18, 2013 is expressly incorporated by reference herein.

What is claimed is:

1. A transmissive display device that allows a user to visually recognize a content as a virtual image, comprising:
   a display part that displays the content in a predetermined display area;
   a light source for image light that forms the content displayed by the display part; and
   at least one processor that executes one or more programs to realize one or more functions of:
      an image processing part that receives, from one or more external supply sources, input image data representative of the content,
      a background color determination part that determines a background color of the input image data received from the one or more external supply sources; and
      a brightness adjustment part that
         calculates an intensity of the light source based on the determined background color of the input image data received from the one or more external supply sources, and
         adjusts the intensity of the light source based on the calculated intensity of the light source to facilitate visual recognition of the content as the virtual image,
   wherein the calculating of the intensity of the light source comprises determining whether the background color of the input image data received from the one or more external supply sources is equal to or greater than a predetermined threshold value.

2. The transmissive display device according to claim 1, wherein the at least one processor executes the one or more programs to further realize one or more functions of a use environment brightness determination part that determines use environment brightness,
   wherein the brightness adjustment part adjusts the intensity of the light source based further on the use environment brightness.

3. The transmissive display device according to claim 2, wherein the calculating of the intensity of the light source further comprises determining whether the use environment brightness is equal to or greater than a second predetermined threshold value.

4. The transmissive display device according to claim 3, wherein the brightness adjustment part calculates the intensity of the light source to be a first brightness level if the background color of the image data received from the one or more external supply sources is equal to or greater than the first predetermined threshold value and the use environment brightness is less than the second predetermined threshold value, and calculates the intensity of the light source to be a second brightness level different from the first brightness level if the background color of the image data received from the one or more external supply sources is less than the first predetermined threshold value and the use environment brightness is equal to or greater than the second predetermined threshold value.

5. The transmissive display device according to claim 4, wherein the second brightness level is brighter than the first brightness level.

6. The transmissive display device according to claim 1, wherein
the content is a book content, and
the background color determination part determines the background color in a text area of the book content.

7. The transmissive display device according to claim 6, wherein the at least one processor executes the one or more programs to further realize one or more functions of a character color determination part that determines a character color in the text area,
wherein the brightness adjustment part adjusts the intensity of the light source based further on the character color.

8. The transmissive display device according to claim 1, wherein the background color determination part determines a color most frequently appearing in the image data received from the one or more external supply sources as the background color of the image data received from the one or more external supply sources.

9. The transmissive display device according to claim 1, wherein the background color determination part detects areas in the same color in a predetermined or wider range from the content and determines the color of the areas in the same color as the background color of the image data received from the one or more external supply sources.

10. The transmissive display device according to claim 1, wherein
the content is a book content, and
the background color determination part detects data in a predetermined position in a predetermined page of the book content and determines a color of the data in the predetermined position in the predetermined page of the book as the background color of the image data received from the one or more external supply sources.

11. The transmissive display device according to claim 1, wherein
the light source includes a backlight for right eye and a backlight for left eye, and
the brightness adjustment part independently adjusts an intensity of the backlight for right eye and an intensity of the backlight for left eye.

12. The transmissive display device according to claim 1, wherein the brightness adjustment part calculates the intensity of the light source to be a first brightness level if the background color of the image data received from the one or more external supply sources is equal to or greater than the first predetermined threshold value, and calculates the intensity of the light source to be a second brightness level different from the first brightness level if the background color of the image data received from the one or more external supply sources is less than the first predetermined threshold value.

13. The transmissive display device according to claim 12, wherein the second brightness level is brighter than the first brightness level.

14. The transmissive display device according to claim 1, further comprising a display driving part that includes the light source.

15. The transmissive display device according to claim 14, wherein the display driving part includes at least one of a liquid crystal display device, an organic electro-luminescence display device, a digital micromirror device, a laser retina projection device, and a scanning system using a micro electro-mechanical system ("MEMS") mirror.

16. A method of controlling a transmissive display device that allows a user to visually recognize a content as a virtual image, comprising:
receiving, by a control unit having at least one processor, input image data from one or more external supply sources, the input image data representative of the content;
determining, by the control unit, a background color of the input image data received from the one or more external supply sources;
calculating, by the control unit, an intensity of a light source for image light that forms the content based on the determined background color of the input image data received from the one or more external supply sources; and
adjusting, by the control unit, the intensity of the light source based on the calculated intensity of the light source to facilitate visual recognition of the content as the virtual image,
wherein the calculating of the intensity of the light source comprises determining whether the background color of the input image data received from the one or more external supply sources is equal to or greater than a first predetermined threshold value.

* * * * *